United States Patent [19]

Bartz et al.

[11] Patent Number: 4,601,570

[45] Date of Patent: Jul. 22, 1986

[54] PHOTOGRAPHIC MEDIA ACCUMULATOR SYSTEM

[75] Inventors: Stephen A. Bartz, Jordan; Wayne D. Gunderson, Brooklyn Park, both of Minn.

[73] Assignee: Lucht Engineering, Inc., Minneapolis, Minn.

[21] Appl. No.: 747,991

[22] Filed: Jun. 24, 1985

[51] Int. Cl.[4] .................. G03B 27/32; G03B 27/52; G03B 27/58

[52] U.S. Cl. .................. 355/27; 355/72

[58] Field of Search .................. 355/27, 28, 72; 354/301, 315, 331, 337

[56] References Cited

U.S. PATENT DOCUMENTS

| | | | |
|---|---|---|---|
| 3,538,829 | 11/1970 | Munnich et al. | 355/27 X |
| 4,115,817 | 9/1978 | Suzuki et al. | 355/28 X |
| 4,126,391 | 11/1978 | Nishimoto | 355/27 |
| 4,136,946 | 1/1979 | Nishimoto | 355/28 |
| 4,260,234 | 4/1981 | Burton | 355/28 X |
| 4,405,227 | 9/1983 | Inoue et al. | 355/27 |
| 4,447,146 | 5/1984 | Kogane et al. | 355/28 |

*Primary Examiner*—Richard A. Wintercorn
*Attorney, Agent, or Firm*—Kinney & Lange

[57] ABSTRACT

A photographic exposure and development system including a printer for exposing photographic media, a processor for developing the image exposed on the media and an accumulator intermediate the printer and processor for compensating for the differences in operational speed of the printer and processor. The printer is of the type which discharges exposed photographic media in sheet form, whether the initial supply be in sheet form or in roll form. The accumulator accepts exposed sheets discharged by the printer and stacks the same in ascending chronological order from the bottom of the stack while providing access to the exposed sheets for removal for processing by the processor in ascending chronological order at the top of the stack. In a preferred embodiment, the accumulator includes a plurality of bins which are rotatable with each other between a first position in which the exposed sheets are accepted for stacking and a second position where the stacked sheets are accessible for removal.

15 Claims, 4 Drawing Figures

PHOTOGRAPHIC MEDIA ACCUMULATOR SYSTEM

BACKGROUND OF THE INVENTION

1. Field of the Invention

The present invention relates to a photographic exposure and development system and, particularly, to a system wherein an accumulator compensates for differences in the operational speed of a printer, which exposes a photographic media with the desired image, and a processor, which develops the image exposed on the media.

2. Description of the Prior Art

Photographic printers and processors are known in the prior art. In the former, the photographic media is exposed with a desired image while the latter develops the image exposed on the media by the printer.

Advancing technology has provided a significant increase in the exposure speed of modern printers. However, the processing of an exposed image to a developed print remains a chemical process which requires a predetermined time, independent of the speed of the printing or exposure operation. As a result, modern printers are capable of exposing a significantly greater amount of photographic material during a given interval than current processors are capable of processing, during that same interval. Thus, to integrate current printers and processors into a system, it has been necessary to provide an interface which will compensate for the differences in printer and processor operational speeds.

One approach to compensate for the relative slowness of the processor has been referred to by those familiar in the art as a "dealer". In these systems, exposed photographic media is accepted from the printer in sheet form and distributed across a conveyor such that multiple sheets that were exposed at different times are processed by the processor at the same time. In such systems, the distribution or placement of the exposed media is a complex mechanical operation that often results in a "dropping" of one or more of the sheet form media to be processed, prior to reaching the processor.

An alternative to the "dealer," discussed above, operates on a web of exposed photographic media and provides a variable length travel path so as to accumulate the media at the rate it is discharged from the printer while feeding the media to the processor at its operational speed. This is accomplished by forming loops intermediate the printer and processor, as through the use of movable rollers which establish the loops and move to vary the loop dimensions in accordance with the relative operational speeds of the printer and processor. Clearly, such a system is restricted to use with a printer in which the photographic media to be exposed is in web form, typically carried by a supply roll, in known manner. Further, the space requirements for such a system are often significant which renders the system impractical in some environments.

SUMMARY OF THE INVENTION

The present invention provides an improvement in a photographic exposure and development system wherein the printer exposes a photographic media with the desired image and a processor develops the image exposed on the media. An accumulator is positioned intermediate the printer and processor to accumulate the excess capacity of the printer relative to the processor. The accumulator of the present invention is adapted to cooperate with a printer that discharges exposed photographic media in sheet form, although the printer itself may be loaded with photographic media in sheet form or in roll form. In the latter case, the photographic media is cut into sheets prior to discharge to the accumulator.

In accordance with the present invention, the accumulator accepts exposed sheets of photographic media and stacks the same in ascending chronological order within a bin. That is, exposed sheets of photographic media are stacked, within a bin, on top of previously exposed sheets with the lowermost sheet within a bin being the first exposed sheet within the stack and the uppermost sheet in the stack being the last exposed sheet in the stack. After a desired number of sheets have been accumulated and stacked, the bin is rotated about an axis such that the stack and exposed sheets are accessible in ascending chronological order from the top of the stack. A plurality of bins may be employed to accumulate continuing printer production while allowing previously exposed sheets to be removed from the accumulator and fed to the processor for further processing, in the order in which they were exposed (i.e. ascending chronological order). In a preferred embodiment, the bins are generally horizontal during the acceptance and stacking of exposed sheets and are inclined during sheet removal. In the inclined orientation, a wall forming a part of the bin provides a registration surface for one edge of each exposed sheet stacked within that bin. In this manner, sheets of varying sizes may be accomodated within the accumulator of the present invention.

DETAILED DESCRIPTION OF THE PREFERRED EMBODIMENTS

The present invention provides a photographic exposure and development system including a printer which exposes a photographic media with a desired image and a processor which develops the image exposed on the media. Modern control and material handling improvements have allowed printer speed to increase to a point where it exceeds the processing capabilities of state of the art photographic media processors. Thus, to integrate those components within an overall exposure and development system, it is necessary to run the printer at less than capacity or to otherwise compensate for the differences in operational speed. In accordance with the present invention, this is accomplished by way of an accumulator which accepts exposed photographic media from the printer in sheet form and stacks the same in ascending chronological order within a bin. These stacked, exposed sheets are removed from the bin, also in ascending chronological order, at the top of the stack and in accordance with the processing capabilities of the processor. Thus, an accumulator in accordance with the present invention, compensates for the differences in operational speed between the printer and processor while feeding photographic media to the processor in the order in which it was exposed by the printer. For the purposes of this specification and claims, the phrase "ascending chronological order" means that a sheet of exposed photographic media is being operated on in the order of its exposure. During stacking, as that term is used herein, an exposed sheet of photographic media is positioned atop previously exposed sheets in the order of their exposure (ascending chronological order from the stack bottom). During removal, earlier exposed sheets are positioned of the top of the stack (ascending chronological order from the top) and are removed from the stack top before later exposed sheets. Also, the term "sheet form" or "sheet" is intended to cover a relatively short portion of photographic media bearing a single exposed image or an identifiable array of exposed images. This is in contrast to "roll form" or a "roll" photographic media which constitutes an elongated web of material typically contained on or as a supply roll. In accordance with the present invention, the initial supply of photogaphic media may be either sheet form or roll form with the discharge from the printer being in sheet form. Within the context of the present invention, the term "discharge from the printer" is intended to embrace an input to the accumulator.

Figure 1:
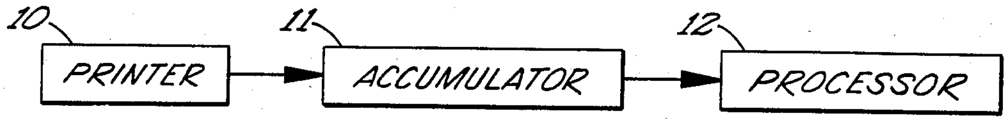
FIG. 1 illustrates a photographic exposure and development system including a printer, accumulator and processor.

FIG. 1 illustrates the concept of the present invention and includes a printer 10, accumulator 11 and processor 12. As noted above, the printer may operate on a photographic media in either roll or sheet form with its discharge (the input to the accumulator 11) being in sheet form. Exposed, sheet form photographic media is withdrawn from the accumulator 11 and conveyed to the processor 12 for processing in conventional manner. Accumulator 11 accepts exposed sheet form media from the printer at the printer's normal operating rate and conveys accumulated media to the processor at the processor's normal processing rate. In this manner, differences in operational speed between the printer 10 and processor 12 are accomodated.

Figure 2:
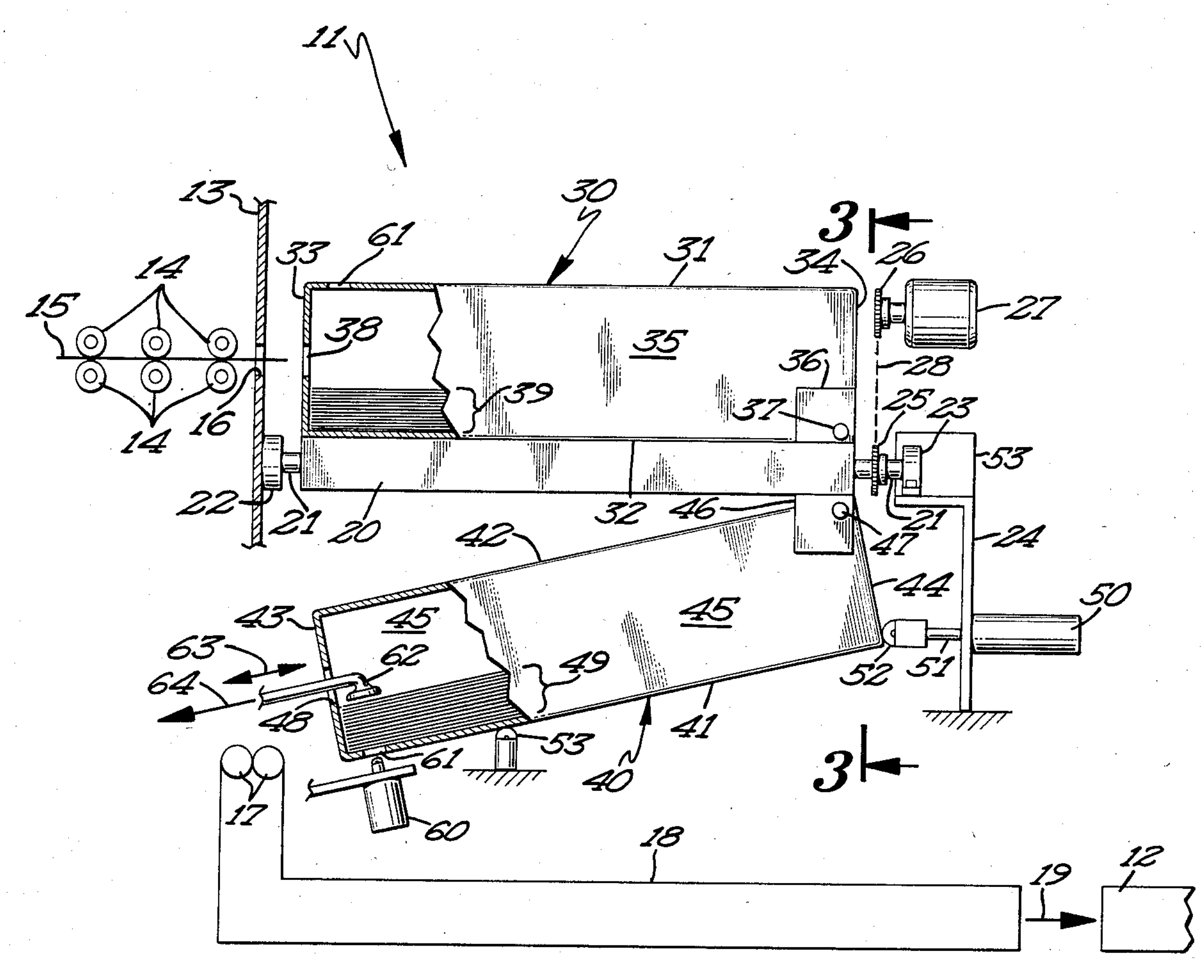
FIG. 2 is a diagramatic illustration of a preferred accumulator embodiment in accordance with the present invention and its in cooperation within a system of the type illustrated in FIG. 1.

FIG. 2 illustrates the operational characteristics of an accumulator 11 in accordance with the present invention and also illustrates its interface between the printer 10 and processor 12 of FIG. 1. As shown in FIG. 2, the wall 13 represents the outer case of the printer 10 with rollers 14 serving to support and convey a sheet of exposed photographic media 15 through a slot or discharge opening 16 in the wall 13. Rollers 17 serve as an input to a conveying system 18 which convey the exposed sheets of photographic media to the processor 12, as indicated by the arrow 19.

As shown in FIG. 2, the accumulator 11 includes a frame 20 supported for rotation with a shaft 21. The shaft 21 may be supported at one end by a bearing 22 carried by the wall 13 of the printer 10 and at the other end by a bearing 23 carried by a support 24. The bearings 22 and 23 may be supported otherwise than as shown in FIG. 2 while the support 24 is for purposes of illustration only in that its function may be provided by any suitable structural member forming a part of the accumulator 11.

The shaft 21 carries a pulley 25 which is driven by a pulley 26 powered by a motor 27 via a belt 28. The pulleys 25 and 26 may be formed as gears through the provision of teeth with corresponding structure being incorporated into the belt 28. Also, the motor 27 may be a stepper motor to provide a better control over the angular orientation of the shaft 21 in known manner.

Still referring to FIG. 2, a first bin 30 is supported in a generally horizontal orientation by the frame 20 and includes an upper support wall 31, a lower support wall 32, end walls 33 and 34 and side walls 35. Preferably, the frame 20 is configured to support the bin 30, when the bin 30 is in the horizontal orientation illustrated in FIG. 2, generally at and around its periphery. A pair of plates 36 (only one being illustrated in FIG. 2) are secured to and extend upwardly from frame 20 to lie outside each of the side walls 35 generally at the junction of the side walls 35 with the end wall 34 and bottom wall 32. An axle 37 extends between the plates 36 associated with the bin 30 to secure the bin 30 to the frame 20 while allowing a pivotal movement of the bin 30 relative to the frame 20, in a manner to be described more fully below.

End wall 33 of bin 30 is provided with a slot 38 which accepts exposed sheets of photographic media, such as that illustrated at 15 in FIG. 2, as those sheets are discharged from the printer. Exposed sheets from the printer pass through the slot 38 and into stacking relation with other exposed sheets discharged by the printer. In this manner, the exposed sheets are accumulated within the bin 30 in ascending chronological order from the bottom wall 32 in that the lowermost sheet is the first exposed of those within the bin 30 while the uppermost sheet is the last exposed of those within the bin 30. Exposed sheets excepted and accumulated within the bin 30 are bracketed by the bracket 39 and are illustrated in spaced relation for the purpose of illustration. However, it is to be understood that the sheets lie atop one another when in stacking relation within the bin 30.

In the embodiment illustrated in FIG. 2, the accumulator 11 includes a second bin 40 which may be otherwise generally identical to the bin 30 with element 41 corresponding to element 31, element 42 corresponding to element 32, etc. However, bin 40 is shown in an inclined orientation pivoted away from the frame 20 about an axle 47. The orientation of the bin 40 is controlled by a cylinder 50 acting on the end wall 44 of bin 40 through its shaft 51 and an associated roller connection 52. Roller connection 52 may be merely a sphere supported within a holder and being rotatable on movement of the end wall 44 relative to the sphere surface. Extension of the shaft 51 will cause the bin 40 to raise to a generally horizontal position while retraction of the shaft 51 will allow the bin 40 to pivot to an inclined orientation. A stop 53 may be provided to limit the amount of pivotal motion of the bin 40 about the axle 47 although this may be controlled through the cylinder 50 alone. The cylinder 50 may be of any convenient, controllable type including hydraulic, pneumatic and electrical such as a solenoid, for example.

Bins 30 and 40 are adapted for rotation about the shaft 21, under the power of the motor 27, between a first position occupied by the bin 30 in FIG. 2 in which exposed photographic media is accepted from the printer in sheet form and stacked within the bin 30 on its lower wall 32 and a second position, occupied by bin 40 in FIG. 2. Assuming for the moment that the bin 40 is empty and that operation of the exposure and develoment system, including the printer and processor, has just been initiated, the bin 30 will accept and accumulate, in stacked relation, the desired number of sheets discharged by the printer. When the desired number of sheets have been accumulated and stacked, and with the shaft 51 of cylinder 50 in the extended position such that the bin 40 is also in a horizontal position, the motor 27 is activated to rotate the shaft 21 and, accordingly, the bins 30 and 40. During this rotation, the roller bearing 52 rolls along the wall 44 to maintain the bin 40 against the frame 20 until the wall 34 of bin 30 comes into contact with the roller 52. At that point, the roller 52 maintains the bin 30 against the frame 20 while gravity will begin to act on the bin 40 to maintain it against the frame 20. When the bins 30 and 40 have reversed the positions illustrated in FIG. 2, the motor 27 is stopped. At that point, a registration device 53 having an extendable pin is activated with the pin extending from the device 53 and into engagement with an aperture (not shown in FIG. 2) in the frame 20 to assure registration of the slot 48 of bin 40 with the discharge of the printer. In this position, the bin 40 can accept and stack exposed sheets from the printer while those previously stacked in the bin 30 may be removed from the bin 30 to be conveyed to the processor 12, as described below. Before withdrawal, the bin which underlies the frame 20 is allowed to assume an inclined orientation, under the action of gravity, by retraction of the shaft 51.

It should be noted that the sheets stacked within the uppermost bin (30 in FIG. 2) are arranged in ascending chronological order from the wall 32 which supports them. However, on rotation of the shaft 21, the sheets within the bin are supported by the opposing supporting surface (41 in bin 40 as illustrated in FIG. 2). When supported on the opposing surface, the sheets are stacked in ascending chronological order from the top of the stack toward the supporting wall. Thus, the order in which the sheets are exposed may be maintained as the sheets are withdrawn from the lowermost inclined bin and conveyed to the processor 12.

Sheet withdrawal is assisted by a cylinder 60 whose shaft extends through an aperture 61 of that bin which is in the inclined orientation and into engagement with the stacked sheets contained therein. On further extension of the shaft of cylinder 60, the stack of exposed sheets is raised with the uppermost sheet being brought into contact with a "picker" which engages the uppermost sheet through the aperture 38 or 48 of the associated one of the bins 30 and 40. At this point, the shaft of cylinder 60 may be retracted to "drop" all but the uppermost sheet which is retained by the picker 62. Preferably, the picker 62 is a vacuum device movable in and out of the slot 48 of bin 40 (in the orientation shown in FIG. 2) as illustrated by the double headed arrow 63. The arrow 64 illustrates the suction by which the vacuum is established. By known mechanical devices, picker 62 is withdrawn from the slot of the associated bin to bring the uppermost sheet within the bin into contact with the rollers 17 which accept that sheet into the conveyor 18 for delivery to the processor 12. The sheet removed from the bin by the picker may be ejected from the picker by reversing the vacuum described above, that is, an airflow may be established from the picker against the sheet it holds to facilitate separation of the two. The rate at which sheets are withdrawn and conveyed to the processor 12 is controlled by the processing rate of the processor, in known manner.

Figure 3:
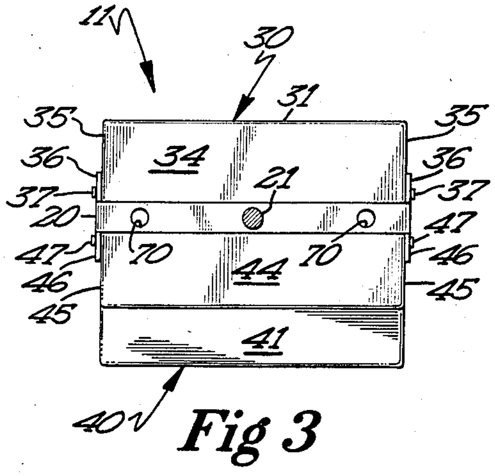
FIG. 3 is a view taken along the line 3—3 in FIG. 2 with supporting, motion imparting and registration elements removed for the sake of clarity.
Figure 4:
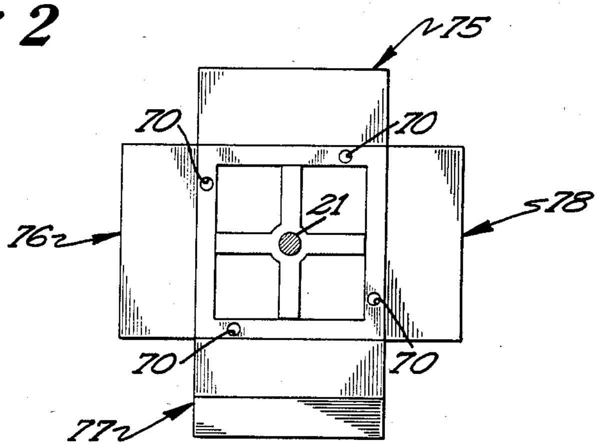
FIG. 4 is a view similar to that of FIG. 3 illustrating a further embodiment.

FIG. 3 is a view of the embodiment of FIG. 2 taken along the line 3—3 with various supporting, motion imparting and registration devices removed for the sake of clarity. What is illustrated in FIG. 3, but not in FIG. 2, is the aperture 70 which cooperates with the pin of the registration device 53 to maintain the position of the frame 20 such that the aperture of the uppermost bin is in proper registration with the discharge of the printer. A similar view to that of FIG. 3 is illustrated in FIG. 4 in an embodiment employing four bins 75–78. The bins 75–78 are supported for rotation about a shaft 21 by a structure corresponding functionally to the frame 20 of FIG. 2. However, in most instances it is believed that a two bin system will be adequate, particularly in those instances where printer operation is intermittent.

It should be noted that the stacked sheets with exposed photographic media embraced by the bracket 49 of FIG. 2 are of varying length with those sheets being operated upon by gravity to urge them against the end wall 43 of bin 40. Thus, the end wall 43 of bin 40 (and the end wall 33 of bin 30 when the bin 30 is in the orientation illustrated by bin 40 in FIG. 2) provides a reference surface for one edge of each exposed sheet stacked within the bin without reference to the length of the sheet. The raising and dropping of the stack by the shaft of cylinder 60, as described above, and the action of gravity on the sheets in the stack promotes the movement of those sheets into engagement with the reference surface.

Obviously, many modifications and variations of the present invention are possible in light of the above teachings. For example, the removal of exposed sheets may be monitored by a reflection photo-electric device whose "light" impinges on sheets within a bin through an aperture in one of the bin walls. The absence of sheets within the bin will eliminate the reflection to result in a signal that the bin is empty. It is therefore to be understood, that, within the scope of the appended claims, the invention may be practiced otherwise than as specifically described.

What is claimed is:

1. In a photographic exposure and development system of the type having printer means for exposing photographic media with a desired image, having processor means for developing the image exposed on said media and having accumulator means intermediate the printer means and processor means for compensating for differences in operational speed between the printer means and processor means, the improvement wherein said printer means discharges exposed photographic media in sheet form, said accumulator means comprising means accepting exposed sheets of photographic media for stacking the same in ascending chronological order from the stack bottom and means for providing access to said exposed sheets for removal in ascending chronological order at the top of said stack.

2. The photographic system of claim 1 wherein said accumlator means comprises a plurality of bin means rotatable with each other about a first axis between a first position wherein said exposed sheets are accepted for stacking and a second position wherein said stacked sheets are accessible for removal.

3. The photographic system of claim 2 wherein there are two bin means.

4. The photographic system of claim 2 wherein said bin means are generally horizontal in said first position and are selectively inclined in said second position.

5. The photographic system of claim 2 wherein said bin means comprise first and second support wall means, first and second end wall means and side wall means, one end wall means of each bin means providing registration means for one edge of each exposed sheet stacked therein.

6. The photographic system of claim 5 wherein said one end wall means further comprises slot means for accepting said exposed sheets and for providing access thereto for removal.

7. The photographic system of claim 6 further comprising means supporting each bin means in a generally horizontal orientation in said first position while allowing said bin means to pivot to an inclined orientation in said second position and means for controlling the orientation of a bin means in said second position.

8. The photographic system of claim 7 wherein said orientation controlling means comprises roller bearing means acting on a bin means end wall means.

9. The photographic system of claim 8 wherein there are two bin means.

10. The photographic system of claim 8 further comprising vacuum picker means insertable to overlie the stacked, exposed sheets of a bin means in said inclined orientation and cylinder means acting on said stacked, exposed sheets for bringing the top sheet into contact with said vacuum means.

11. The photographic system of claim 5 wherein said first axis is generally perpendicular to said one end wall means when its bin means is in said first position and further comprising pivot means allowing rotation of said bin means about a second axis generally parallel to said one end wall means.

12. The photographic system of claim 11 wherein said one end wall means further comprise slot means for accepting said exposed sheets and for providing access thereto for removal.

13. The photographic system of claim 12 further comprising means for controlling the orientation of a bin means in said second position.

14. The photographic system of claim 13 wherein said orientation controlling means comprises roller bearing means acting on a bin means end wall means.

15. The photographic system of claim 14 wherein there are two bin means.

* * * * *